(12) United States Patent  
Gregory

(10) Patent No.: US 6,450,694 B1
(45) Date of Patent: Sep. 17, 2002

(54) DYNAMICALLY CONFIGURABLE BACKPLANE

(75) Inventor: Bryan Gregory, Glen Ellyn, IL (US)

(73) Assignee: Corona Optical Systems, Inc., Lombard, IL (US)

( * ) Notice: Subject to any disclaimer, the term of this patent is extended or adjusted under 35 U.S.C. 154(b) by 69 days.

(21) Appl. No.: 09/597,028

(22) Filed: Jun. 20, 2000

(51) Int. Cl.⁷ ................................................ G02B 6/36
(52) U.S. Cl. .......................................... 385/53; 385/88
(58) Field of Search ...................................... 385/53.88

(56) References Cited

U.S. PATENT DOCUMENTS

| | | | | |
|---|---|---|---|---|
| 3,759,590 A | * | 9/1973 | Arnaud | 385/129 |
| 5,067,787 A | | 11/1991 | Gillham et al. | 385/50 |
| 5,526,154 A | * | 6/1996 | Pyhalammi | 359/125 |
| 5,793,919 A | | 8/1998 | Payne et al. | 385/135 |
| 6,009,491 A | * | 12/1999 | Roppel et al. | 710/128 |
| 6,016,211 A | | 1/2000 | Szymanski et al. | 359/117 |
| 6,057,560 A | * | 5/2000 | Uchida | 257/94 |
| 6,226,296 B1 | | 5/2001 | Lindsey et al. | 370/401 |

* cited by examiner

Primary Examiner—Ellen E. Kim
(74) Attorney, Agent, or Firm—Welsh & Katz, Ltd.

(57) ABSTRACT

A method and apparatus are provided for transporting a plurality of information signals among a plurality of signal processing boards all located within a single cabinet of an information processing system. The method includes the steps of connecting a plurality of multi-mode fibers among the plurality of signal processing boards and electrooptically converting an information signal of the plurality of transported information signals between an electrical format used on a corresponding pair of signal processing boards of the plurality of signal processing boards and an optical format used for transmission through a corresponding multi-mode fiber of the plurality of multi-mode fibers. The method further includes the step of optically switching a transported information signal of the transported information signals between a set of multi-mode fibers of the plurality of multi-mode fibers.

3 Claims, 5 Drawing Sheets

DYNAMICALLY CONFIGURABLE BACKPLANE

FIELD OF THE INVENTION

The field of the invention relates to computers and more particularly to signal processing systems.

BACKGROUND OF THE INVENTION

Signal processing systems are generally known. Typically, such systems are designed for some particular signal processing, switching or routing goal (e.g., Carrier class routers which direct internet protocol traffic, Enterprise switches which manage corporate Ethernet traffic, Dense Wavelength Division Multiplexing transmission equipment which transmit telephony and data-traffic over optical fibers.) Often such systems are designed by first defining a set of inputs and outputs. Inputs and outputs may be categorized according to processing requirements. Often some inputs/outputs have special processing requirements (e.g., Fourier analysis of spectral components for speech recognition, categorization of trends, etc.).

To achieve overall processing goals, a number of different signal processing engines must be designed or purchased. Often the individual processing engines are specified as discrete devices to take advantage of commercially available processing boards.

While such commercially available devices are effective, they often have input/output requirements which can overwhelm most backplane systems. Accordingly, a need exists for a communications system which is capable of operating in a high-speed environment, but which is capable of reconfiguration where necessary.

SUMMARY

A method and apparatus are provided for transporting a plurality of information signals among a plurality of signal processing boards all located within a single cabinet of an information processing system. The method includes the steps of connecting a plurality of multi-mode fibers among the plurality of signal processing boards and electrooptically converting an information signal of the plurality of transported information signals between an electrical format used on a corresponding pair of signal processing boards of the plurality of signal processing boards and an optical format used for transmission through a corresponding multi-mode fiber of the plurality of multi-mode fibers. The method further includes the step of optically switching a transported information signal of the transported information signals between a set of multi-mode fibers of the plurality of multi-mode fibers.

DETAILED DESCRIPTION OF A PREFERRED EMBODIMENT

Figure 1:
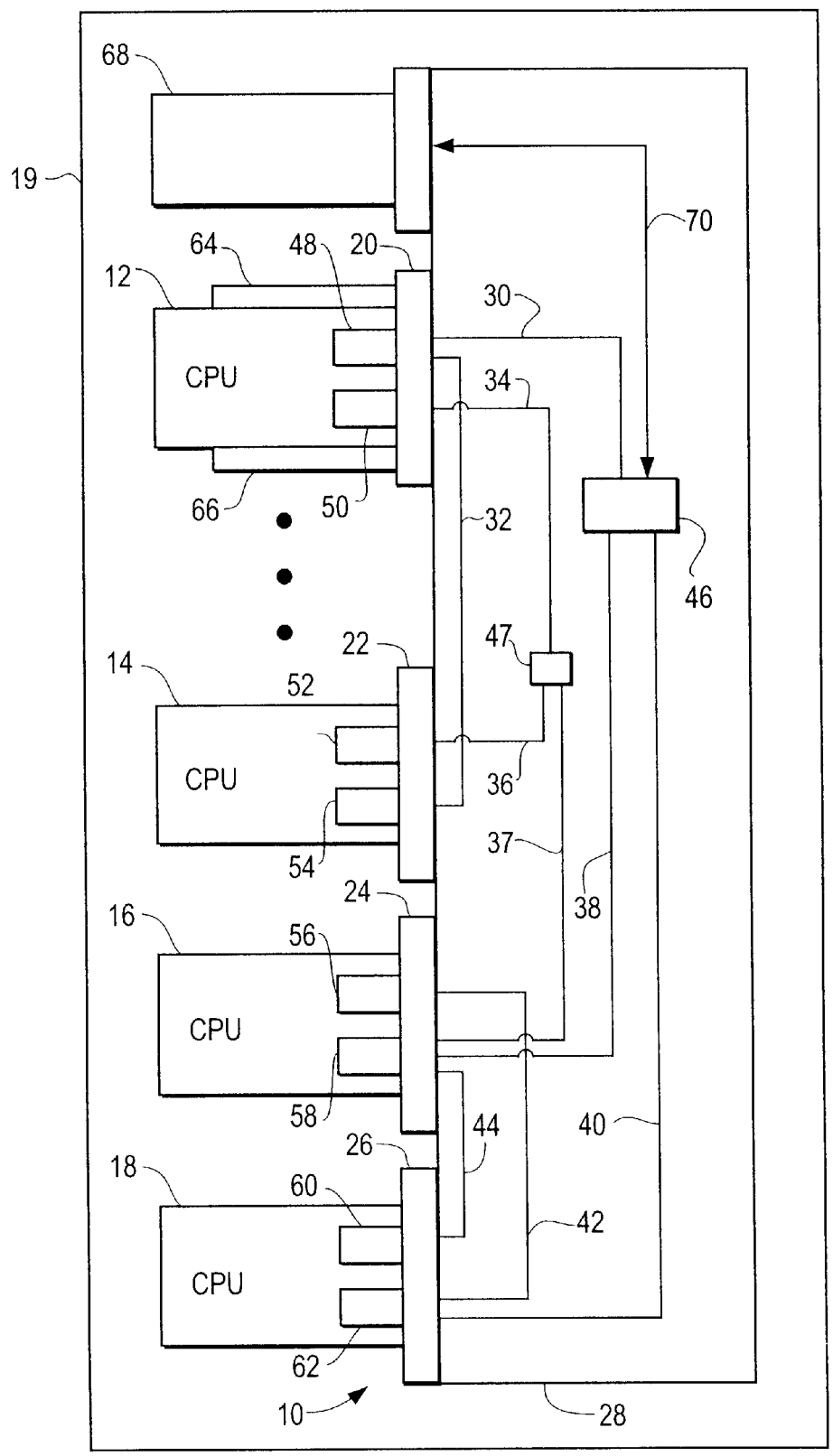
FIG. 1 depicts an optical communication system in accordance with an illustrated embodiment of the invention.

FIG. 1 is a block diagram of an optical communication system 10, shown generally in a context of use, for transporting information signals among information processing boards. Such system 10 may have great utility wherever information must be processed and wherever the processing requirements include a multitude of separate signal processing boards 12, 14, 16, 18, all located within a single common cabinet or enclosure 19 or within one or more closely spaced enclosures.

As shown, the signal processing boards 12, 14, 16, 18 may be connected by one or more multi-mode optical fibers 30, 32, 34, 36, 37, 38, 40, 42, 44. One or more optical switches 46 may be provided to dynamically modify the routing of information signals within the system 10. Splitters 47 may also be used where signals must be delivered to a multitude of destinations.

The signal processing boards 12, 14, 16, 18 may be coupled to the optical communication system 10 using one or more stationary blind-mate connectors 20, 22, 24, 26 and blind-mate connector modules 48, 50, 52, 54, 56, 58, 60, 62. The stationary blink-mate connectors 20, 22, 24, 26 and blind-mate connector modules 48, 50, 52, 54, 56, 58, 60, 62 provide an interface through which signals generated or used on the signal processing boards 12, 14, 16, 18 may be coupled one-to-another through the optical communication system 10.

As used herein the blind-mate connector modules 48, 50, 52, 54, 56, 58, 60, 62 may function simply as alignment devices between the multi-mode fibers of each of the signal processing boards and corresponding mating multi-mode fibers of the stationary blind-mate connectors 20, 22, 24, 26 of the communication system 10. Alternatively, the blind-mate connector modules 48, 50, 52, 54, 56, 58, 60, 62 may also provide the additional function of performing electrooptic conversion between signals processed under an electric format within the signal processing boards 12, 14, 16, 18 and signals transported under an optical format within the communication system 10.

Figure 2:
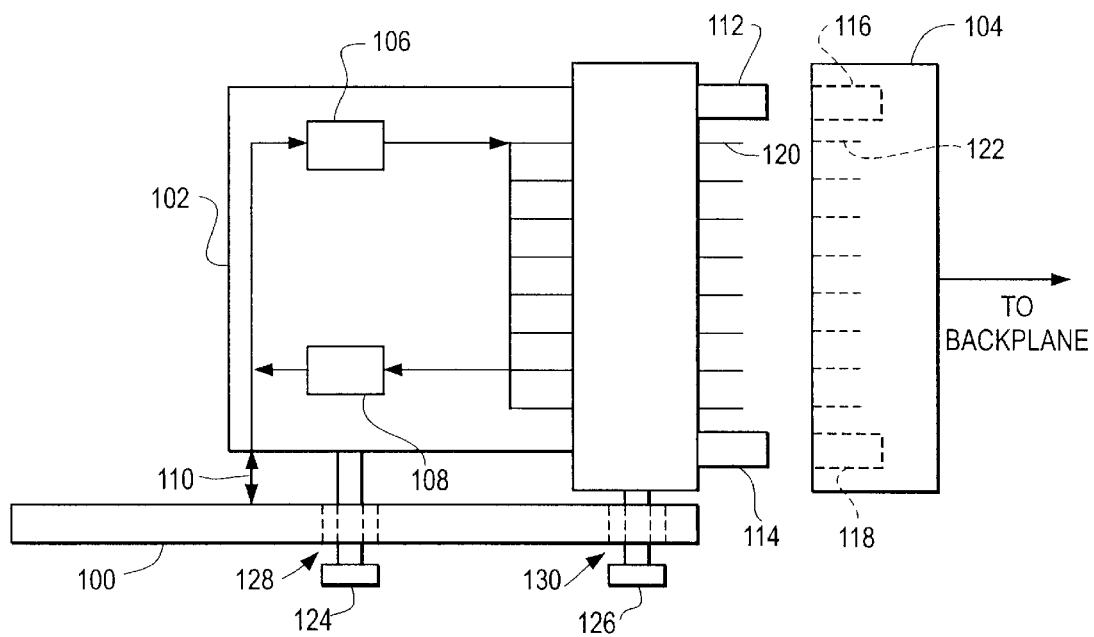
FIG. 2 depicts a blind-mate connector assembly used by the system of FIG. 1.

As used herein the term "blind-mate connector" means a connector which relies on a combination of alignment mechanisms to achieve a final alignment between its connected elements. For example, FIG. 2 shows a side-view of one of the blind-mate connector assemblies of FIG. 1. Reference number 100 may be regarded as typical of the signal processing boards 12, 14, 16, 18 of FIG. 1. Reference number 102 may be regarded as typical of connector modules 48, 50, 52, 54, 56, 58, 60, 62 and reference number 104 may be typically of a portion of the stationary blind-mate connectors 20, 22, 24, 26. Reference number 122 may be regarded as typical of the multi-mode fibers 30, 32, 34, 36, 37, 38, 40, 42, 44 of the backplane 28. Reference number 120 may be regarded as typical of a multi-mode fiber corresponding to a particular input/output of one of the signal processing boards 12, 14, 16, 18.

To achieve alignment of the connected multi-mode fibers 120, 122, an equipment assembler (not shown) first inserts a signal processing card (e.g., 12) into a card slot 64, 66. The card slot serves as a first mechanism of alignment. As the card 12 nears a "seated" position, a set of guide pins 112, 114 engage a set of tapered holes 116, 118. The tapered holes 116, 118 urges a male member 120 of the multi-mode fiber into alignment with a female receptacle 116, which is also tapered. As the signal processing board 12, 14, 16, 18 reaches the seated position the taper of the female receptacle of the multi-mode fiber 122 urges the male fiber 120 into a final alignment relationship.

To facilitate alignment between the guides 64, 66 of the signal processing card 12, 14, 16, 18 and blind-mate connectors 102, 104, a set of free-floating pins 124, 126 may be provided. Further, the pins 124, 126 may be provided with slotted holes 128, 130 to further allow the blind-mate module 102 to properly align with the stationary blind-mate connector 104.

To couple the communication system 10 to each of the signal processing cards, one or more laser transmitters (e.g., 850 nm VCSEL devices) in the form of a VCSELL array 106 may be provided within some or all of the blind-mate modules 48, 50, 52, 54, 56, 58, 60, 62. Similarly, one or more photonics detectors (e.g., PIN diodes) in the form of a detector array 108 may be provided within some or all of the blind-mate modules 48, 50, 52, 54, 56, 58, 60, 62. The laser transmitter 106 and detector 108 together form a transceiver that may be coupled to the signal processing card 12, 14, 16, 18 through an interface 110.

The interface 110 may simply be an electrical connector where the signal processing boards operate completely under an electric format. Alternatively, where the signal processing boards have optical transceivers, the interface 110 may be a set of optical jumper fibers connecting the blind-mate module 102 to the signal processing card 100.

Under the illustrated embodiment, the optical communication system 10 may provide signal processing cards 12, 14, 16, 18 with optical outputs from other signal processing cards 12, 14, 16, 18. Alternatively, an optical output (e.g., 30) may be routed to an optical switch 46. A switch controller 68 may be used to activate the switch 46, thereby routing optical outputs where necessary for the functioning of the overall system.

Figure 3:
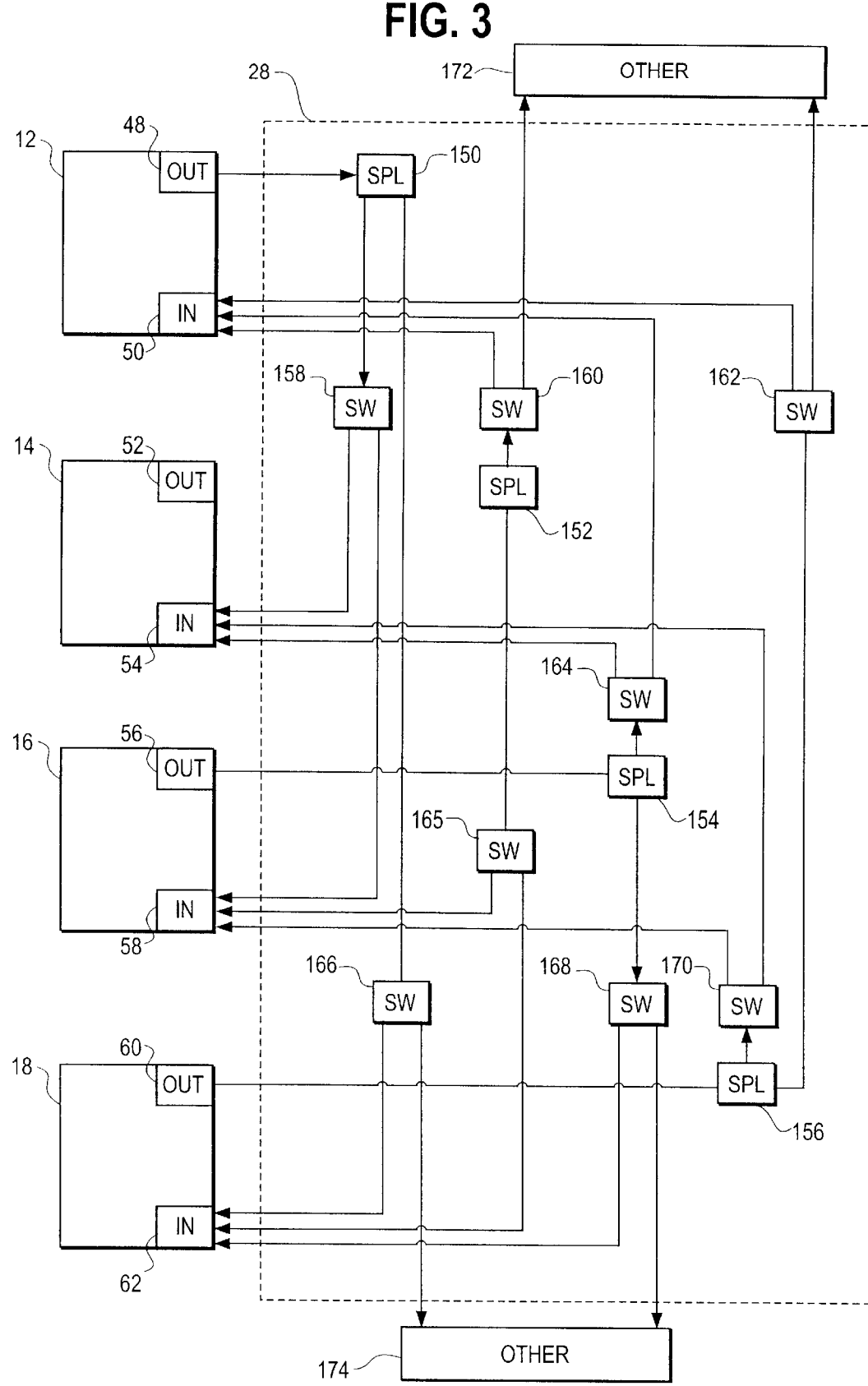
FIG. 3 depicts an alternate embodiment of the optical communication system of FIG. 1 using optical splitters a switches.

FIG. 3 shows the optical routing capabilities of the backplane 28 in more detail. Under the illustrated embodiment of FIG. 3, an output of any signal processing board 12, 14, 16, 18 may be provided as an input to any other signal processing board 12, 14, 16, 18. For purposes of explanation, blind-mate modules 48, 52, 56, 60 have been assumed to be VCSEL arrays providing one or more outputs. Blind-mate modules 50, 54, 58, 62 have been assumed to be detector arrays providing at least four inputs each.

As shown an output of the blind-mate module 48 of first signal processing board 12 is provided as an input to a splitter 150. Any appropriate splitter may be used (e.g., a Gould Fiber Optics Multi-Mode Splitter).

An output of the first splitter 150 may be provided as an input to an optical switch 158. Any appropriate optical switch may be used (e.g., a Litton Electromechanical Multi-Mode Switch).

An output of the optical switch 158 is routed to an input 54, 58 of each of two other signal processing cards 14, 16. The switch 158 under control of switch control 68 may supply the output of the first signal processing board 12 as inputs to either of the other two signal processing boards 14, 16.

Similarly, a second output of the first splitter 150 may be provided as an input to a second switch 166. he switch 166 under control of switch control 68 may upply the output of the first signal processing board 12 as inputs to either the either the fourth signal processing board 18 or to another cabinet 174.

In a similar manner, an output of the second signal processing board 14 is provided as an input to a second splitter 152. Outputs of the second signal processing board 14 may be provided as inputs to the first, third or fourth signal processing boards 12, 16, 18 through switches 152, 165. Similar provisions are made for the outputs of the third and fourth signal processing boards 16, 18.

Figure 4:
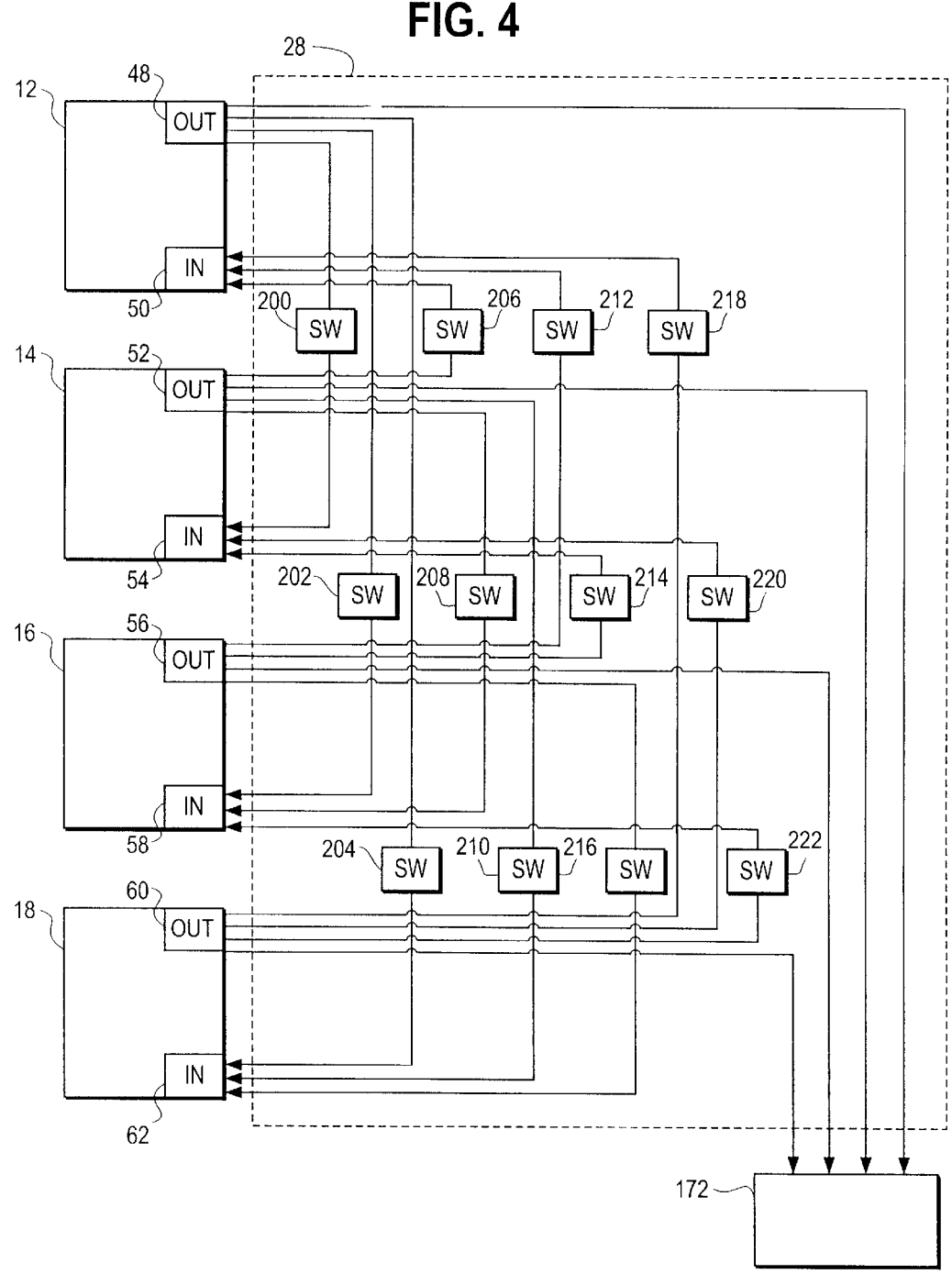
FIG. 4 depicts another alternate embodiment of the optical communication system of FIG. 1 using a switching format.

Under another illustrated embodiment (FIG. 4), blind-mate modules 48, 52, 56, 60 include 4-output VCSEL arrays. A first output is provided through a first switch 200 to an input 54 of the second signal processing board 14. A second output is provided through a second switch 202 to an input 58 of the third signal processing board 16. A third output is provided through a first switch 204 to an input 62 of the fourth signal processing board 14. A fourth output is provided as an input to another cabinet 172.

Similarly, an output 52 of the second signal processing board 14 provides an input 50, 58, 62 to the first, third and fourth signal processing boards 12, 16, 18. The outputs 56, 60 of the third and fourth signal processing boards 16, 18 as similarly provided as inputs to the other boards.

Control of the switches 200, 202, 204, 206, 208, 210, 212, 214, 216, 218, 220, 222 is provided from switch control 68. The proper entry of switch control parameters into switch control 68 allows any output of any signal processing boards 12, 14, 16, 18 to be distributed to any one or more of the other signal processing boards or to other cabinets.

Figure 5:
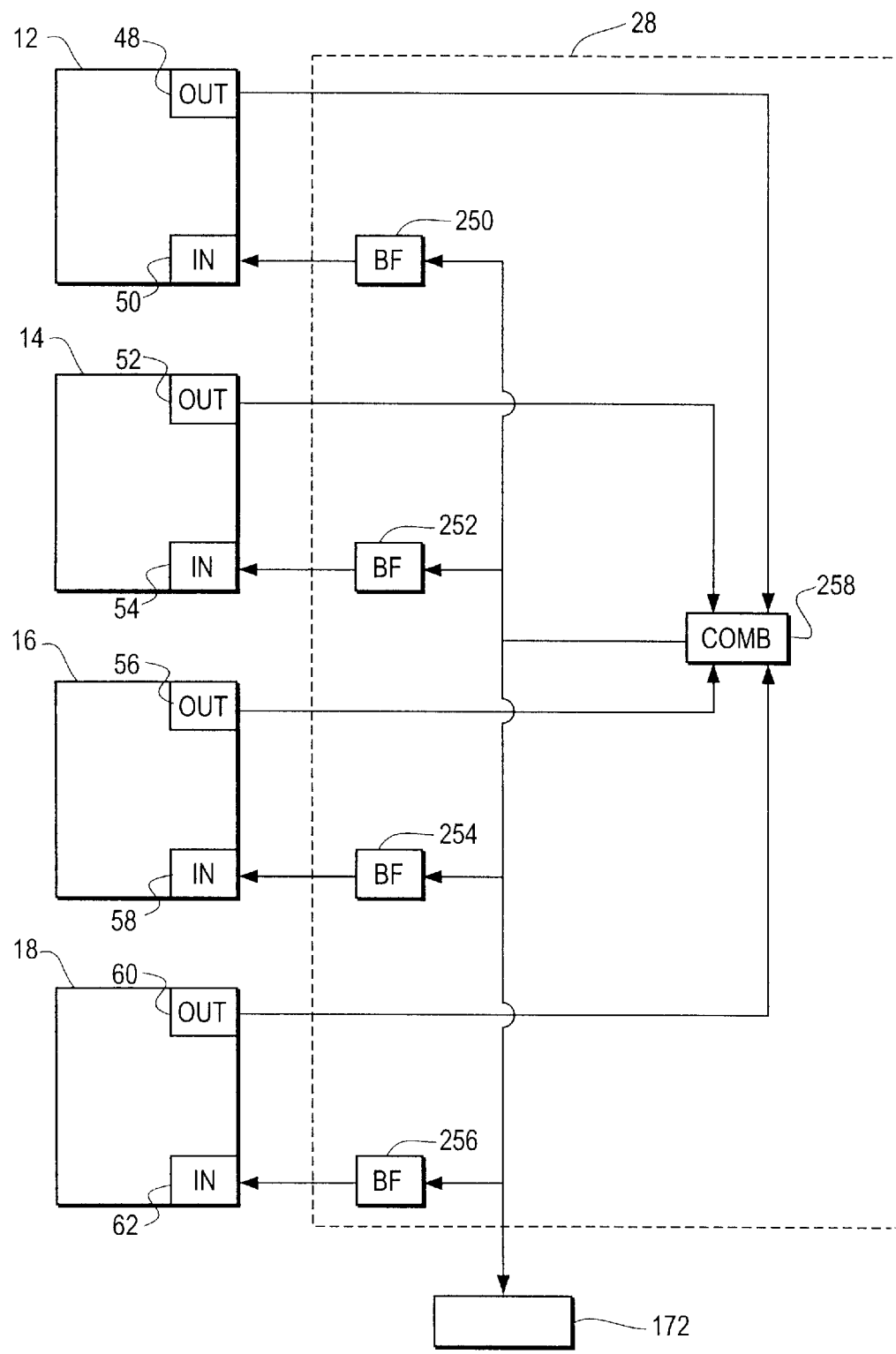
FIG. 5 depicts an alternate embodiment of the optical communication system of FIG. 1 using WDM.

Under another illustrated embodiment (FIG. 5), the communication system 10 may be provided for operation under a wavelength division multiplexing (WDM) format. Under the illustrated embodiment, VSCEL laser arrays within the blind-mate connector modules 48, 52, 56, 60 are operated at a number of different wavelengths (e.g., 820 nm 835 nm, 850 nm, 865 nm, available from Honeywell Corporation). A combiner 258 may be used to combine the modulated information signal from each module 48, 52, 56, 60. Wavelength selective filters (e.g., Bragg filters) 250, 252, 254, 256 may be used to select specific wavelengths that are to be delivered to a particular signal processing board 12, 14, 16, 18.

Under the illustrated embodiment, a number of independent signal processing boards 12, 14, 16, 18 may be integrated using the communication system 10 of FIG. 1. Such a system 10 allows any combination of signal processing boards 12, 14, 16, 18 to be integrated into complex systems with capabilities far beyond the capabilities of any one of the individual signal processing boards. Further, the optical nature of the communication system 10 allows for the transport of information signals at a speed at least comparable to the speed of any one signal processing board.

A specific embodiment of a method and apparatus of providing a communication system among signal processing boards according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of transporting information signals among a plurality of signal processing boards all located within a single cabinet of an information processing system, such method comprising the steps of:

connecting a plurality of multi-mode fibers among the plurality of signal processing boards within the single cabinet;

disposing a VCSEL laser transmitter array on each signal processing board of the plurality of signal processing boards with each VCSEL laser transmitter of the VCSEL laser transmitter array coupled to a corresponding multi-mode fiber of the plurality of multi-mode fibers;

interposing a signal splitter into a multi-mode fiber of the plurality of multi-mode fibers between a VCSEL laser transmitter of a signal processing board and a pair of multi-mode fibers connected to at least two other signal processing boards of the plurality of signal processing boards;

electrooptically converting an information signal of the plurality of transported information signals using the provided VCSEL laser transmitter arrays between an electrical format used on a corresponding pair of signal processing boards of the plurality of signal processing boards and an optical format used for transmission through a corresponding multi-mode fiber of the plurality of multi-mode fibers;

optically switching the transported information signal of the transported information signals between a set of multi-mode fibers of the plurality of multi-mode fibers; and disposing a PIN diode array on each signal processing board with each PIN diode of the PIN diode array coupled to a corresponding multimode fiber of the plurality of multi-mode fibers for conversion of the transported information signal from the optical format of the plurality of multimode fibers to the electrical format of the signal processing board.

2. An apparatus for transporting information signals among a plurality of signal processing boards all located within a single cabinet of an information processing system, such method comprising the steps of:

means for connecting a plurality of multi-mode fibers among the plurality of signal processing boards within the single cabinet;

means for providing a VCSEL laser transmitter array on each signal processing board of the plurality of signal processing boards with each VCSEL laser transmitter of the VCSEL laser transmitter array coupled to a corresponding multi-mode fiber of the plurality of multi-mode fibers;

means for interposing a signal splitter into a multi-mode fiber of the plurality of multi-mode fibers between a VCSEL laser transmitter of a signal processing board and a pair of multi-mode fibers connected to at least two other signal processing boards of the plurality of signal processing boards;

means for electrooptically converting an information signal of the plurality of transported information signals using the provided VCSEL laser transmitter arrays between an electrical format used on a corresponding pair of signal processing boards of the plurality of signal processing boards and an optical format used for transmission through a corresponding multi-mode fiber of the plurality of multi-mode fibers;

means for optically switching the transported information signal of the transported information signals between a set of multi-mode fibers of the plurality of multi-mode fibers; and means for providing a PIN diode array on each signal processing board with each PIN diode of the PIN diode array coupled to a corresponding multimode fiber of the plurality of multi-mode fibers for conversion of the transported information signal from the optical format of the plurality of multimode fibers to the electrical format of the signal processing board.

3. An apparatus.for transporting a plurality of information signals among a plurality of signal processing boards all located within a single cabinet of an information processing system, such method comprising the steps of:

a plurality of multi-mode fibers adapted to provide a plurality of optical signal paths among the plurality of signal processing boards within the single cabinet;

a VCSEL laser transmitter array disposed on each signal processing board of the plurality of signal processing boards and adapted to convert an information signal of the plurality of transported information signals between an electrical format used on a corresponding pair of signal processing boards of the plurality of signal processing boards and an optical format used for transmission through a corresponding multi-mode fiber of the plurality of multi-mode fibers;

a blind mate connector adapted to couple a corresponding multi-mode fiber of the plurality of multi-mode fibers to each VCSEL laser transmitter of the VCSEL laser transmitter array;

a signal splitter interposed into a multi-mode fiber of the plurality of multi-mode fibers between a VCSEL laser transmitter of a signal processing board and a pair of multi-mode fibers connected to at least two other signal processing boards of the plurality of signal processing boards;

an optical switch adapted to switch the transported information signal of the transported information signals between a set of multi-mode fibers of the plurality of multi-mode fibers; and a PIN diode array disposed on each signal processing board of the plurality of signal processing boards with each PIN diode of the PIN diode array adapted to convert a transported information signal from the optical format of the plurality of multimode fibers to the electrical format of the signal processing board; and a blind mate connector adapted to couple a corresponding multi-mode fiber of the plurality of multi-mode fibers to each PIN diode of the PIN diode array.

* * * * *